US011968232B2

(12) United States Patent
Talwar et al.

(10) Patent No.: US 11,968,232 B2
(45) Date of Patent: Apr. 23, 2024

(54) FORWARDING NETWORK TRAFFIC ASSOCIATED WITH A SECURITY CLASSIFICATION VIA A ROUTING PATH ASSOCIATED WITH THE SECURITY CLASSIFICATION

(71) Applicant: Juniper Networks, Inc., Sunnyvale, CA (US)

(72) Inventors: Manish Talwar, Lunenburg, MA (US); Ronald Bonica, Sterling, VA (US); Ajay Kachrani, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 78 days.

(21) Appl. No.: 17/643,246

(22) Filed: Dec. 8, 2021

(65) Prior Publication Data
US 2023/0179633 A1 Jun. 8, 2023

(51) Int. Cl.
*H04L 29/06* (2006.01)
*H04L 9/40* (2022.01)
*H04L 45/30* (2022.01)
*H04L 47/17* (2022.01)
*H04L 12/46* (2006.01)
*H04L 12/66* (2006.01)
*H04L 47/28* (2022.01)

(52) U.S. Cl.
CPC .............. *H04L 63/18* (2013.01); *H04L 45/30* (2013.01); *H04L 47/17* (2013.01); *H04L 63/162* (2013.01)

(58) Field of Classification Search
CPC ......... H04L 63/18; H04L 45/30; H04L 47/17; H04L 63/162
See application file for complete search history.

(56) References Cited

U.S. PATENT DOCUMENTS 8,352,729 B2 * 1/2013 Manning ................. H04L 63/30
713/153
2022/0174016 A1 * 6/2022 Tharaperiya Gamage ...................
H04L 47/28

FOREIGN PATENT DOCUMENTS

CN 113347095 A 9/2021
EP 2797267 A1 * 10/2014 ............. H04L 45/22
EP 2797267 A1 10/2014
(Continued)

OTHER PUBLICATIONS

Dubroca, Sabrina; "MACsec: Encryption for the wired LAN"; Proceedings of Netdev; Feb. 10, 2016. pp. 1-5 (Year: 2016).*
(Continued)

*Primary Examiner* — Fatoumata Traore
*Assistant Examiner* — Courtney D Fields
(74) *Attorney, Agent, or Firm* — Harrity & Harrity, LLP

(57) ABSTRACT

In some implementations, a network device may determine, based on a routing table, a plurality of routing paths from the network device to another network device, wherein the plurality of routing paths are respectively associated with a plurality of security classifications. The network device may receive network traffic that is destined for the other network device and that is associated with a particular security classification of the plurality of security classifications. The network device may forward the network traffic based on a particular routing path, of the plurality of routing paths, that is associated with the other network device and the particular security classification.

20 Claims, 9 Drawing Sheets

(56) References Cited

FOREIGN PATENT DOCUMENTS

WO    WO-2014143025 A1 *  9/2014  ........... H04L 45/127

OTHER PUBLICATIONS

Dahai Xu; Mung Chiang; Jennifer Rexford; "Link-State Routing With Hop-by-Hop Forwarding Can Achieve Optimal Traffic Engineering"; IEEE/ACM Transactions on Networking, vol. 19, No. 6; Dec. 2011; pp. 1717-1730 (Year: 2011).*
Jose Liste, "Segment Routing: Technology Deep-dive and Advanced Use Cases", Jun. 2019, 153 pages, Cisco, Ciscolive!, https://www.ciscolive.com/c/dam/r/ciscolive/us/docs/2019/pdf/BRKRST-3122.pdf.
Extended European Search Report for Application No. EP22155968.5, dated Jul. 1, 2022, 11 pages.
Sabrina., "MACsec: Encryption for the wired LAN," Netdevconf, Feb. 10, 2016, pp. 1-5.
Winjum et al., "Multilevel security for IP routing," Military Communications Conference, IEEE, Nov. 16, 2008, pp. 1-8.

* cited by examiner

FORWARDING NETWORK TRAFFIC ASSOCIATED WITH A SECURITY CLASSIFICATION VIA A ROUTING PATH ASSOCIATED WITH THE SECURITY CLASSIFICATION

BACKGROUND

Media access control security (MACsec) provides secure communication for traffic on physical links, such as Ethernet links. MACsec provides point-to-point security on links between directly connected devices.

SUMMARY

Some implementations described herein relate to a network device. The network device may include one or more memories and one or more processors. The network device may be configured to receive, from another network device, a first message, a second message, and a third message. The network device may be configured to update, based on the first message, the second message, and the third message, a routing table. The network device may be configured to determine, based on the routing table, a first routing path associated with the first security classification from the network device to the other network device, a second routing path associated with the second security classification from the network device to the other network device, and a third routing path associated with the third security classification from the network device to the other network device. The network device may be configured to receive network traffic that is destined for the other network device and that is associated with a particular security classification, of the first security classification, the second security classification, or the third security classification. The network device may be configured to forward the network traffic based on a particular routing path, of the first routing path, the second routing path, or the third routing path, that is associated with the other network device and the particular security classification.

Some implementations described herein relate to a non-transitory computer-readable medium that stores a set of instructions for a network device. The set of instructions, when executed by one or more processors of the network device, may cause the network device to determine, based on a routing table, a first routing path associated with a first security classification from the network device to another network device. The set of instructions, when executed by one or more processors of the network device, may cause the network device to determine, based on the routing table, a second routing path associated with a second security classification from the network device to the other network device. The set of instructions, when executed by one or more processors of the network device, may cause the network device to determine, based on the routing table, a third routing path associated with a third security classification from the network device to the other network device. The set of instructions, when executed by one or more processors of the network device, may cause the network device to receive network traffic that is destined for the other network device and that is associated with a particular security classification, of the first security classification, the second security classification, or the third security classification. The set of instructions, when executed by one or more processors of the network device, may cause the network device to forward the network traffic based on a particular routing path, of the first routing path, the second routing path, or the third routing path, that is associated with the other network device and the particular security classification.

Some implementations described herein relate to a method. The method may include determining, by a network device and based on a routing table, a plurality of routing paths from the network device to another network device, where the plurality of routing paths are respectively associated with a plurality of security classifications. The method may include receiving, by the network device, network traffic that is destined for the other network device and that is associated with a particular security classification of the plurality of security classifications. The method may include forwarding, by the network device, the network traffic based on a particular routing path, of the plurality of routing paths, that is associated with the other network device and the particular security classification.

DETAILED DESCRIPTION

Figure 1A:
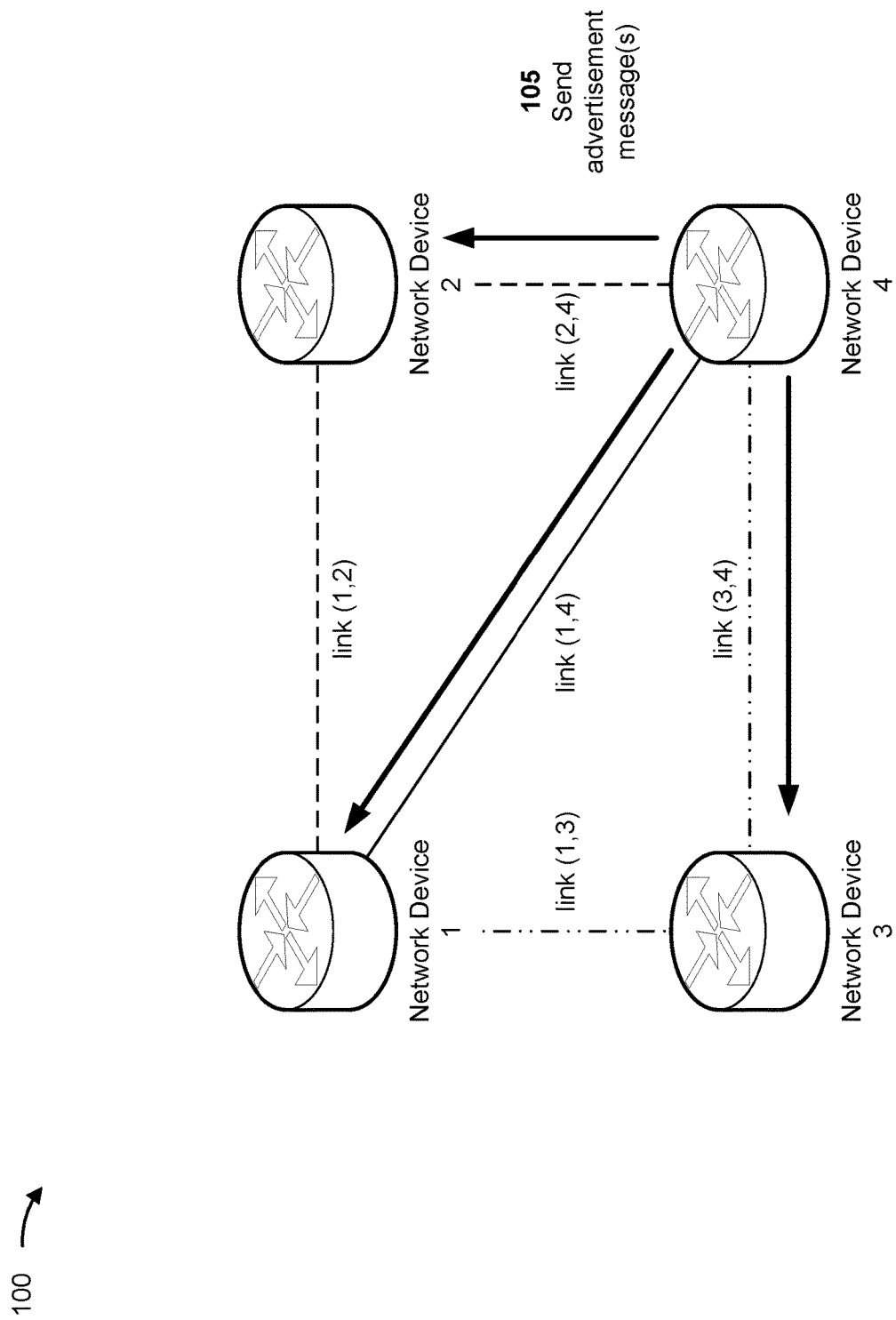
FIGS. 1A-1D are diagrams of an example implementation described herein.

The following detailed description of example implementations refers to the accompanying drawings. The same reference numbers in different drawings may identify the same or similar elements.

In a network of network devices, media access control security (MACsec) can be utilized to provide point-to-point security on links between directly connected network devices. However, for network traffic that needs to be securely routed among more than two network devices and, ensuring that the network traffic transmits via a routing path that includes just MACsec links can be challenging. In some cases, network devices, prior to forwarding network traffic, may process the network traffic using traffic engineering processes (e.g., that are level 3 processes in the open systems interconnection (OSI) model) to encapsulate the network traffic with information to cause the network traffic to be steered via an appropriately secure routing path through the network. But, to perform such traffic engineering processes, the network devices must include specialized hardware. Further, performing such processes often uses significant amounts of computing resources (e.g., processing resources, memory resources, communication resources, and/or power resources, among other examples) and induces a latency, or a delay, associated with routing the network traffic through the network.

Some implementations described herein are directed to determining routing paths for network traffic associated with different security classifications, such as a routing path for public network traffic, a routing path for private network traffic, and/or a routing path for restricted network traffic. Public network traffic may be routed via any type of links. Private network traffic may be routed over links that support authentication (e.g., links that utilize MACsec for authentication and links that utilize MACsec for authentication and encryption). Restricted network traffic may be routed over links that support authentication and encryption (e.g., links that utilize MACsec for authentication and encryption).

In some implementations, each network device in a network sends advertisement messages to other network devices in the network, wherein each advertisement message indicates a security classification of a link of the network device. Accordingly, a network device that receives the advertisement messages updates a routing table based on the advertisement messages and determines, based on the routing table, a routing path associated with each security classification, of a plurality of security classifications supported by the network (e.g., a public security classification, a private security classification, and/or a restricted security classification), from the network device to other network devices in the network. In this way, the network device determines a plurality of routing paths to each of the other network devices in the network (where each routing path, of the plurality of routing paths, is associated with a security classification).

In some implementations, a network device receives network traffic that is destined for another network device in the network and that is associated with a particular security classification of the plurality of security classifications. The network device selects a routing path, of the plurality of routing paths to the other network device, that is associated with the particular security classification and forwards the network traffic to the other network device based on the particular routing path. This causes the network traffic to route through the network via links that provide appropriate security for the network traffic. For example, when the network traffic is public network traffic, the network traffic routes through the network via links of any type in the network; when the network traffic is private network traffic, the network traffic routes through the network via links that support authentication (e.g., links that utilize MACsec for authentication and/or links that utilize MACsec for authentication and encryption); and when the network device is restricted network traffic, the network traffic routes through the network via links that support authentication and encryption (e.g., links that utilize MACsec for authentication and encryption).

In this way, some implementations described herein enable forwarding of network traffic that is associated with a security classification via a routing path that is associated with the security classification. Accordingly, some implementations described herein provide (e.g., using level 2 techniques in the OSI model) an appropriately secure path for routing the network traffic without using traffic engineering processes (e.g., that are level 3 processes in the OSI model). This reduces a complexity of network devices in the network that route network traffic (e.g., because the network devices do not need to include specialized hardware to perform traffic engineering processes). Further, network devices described herein do not need to encapsulate network traffic prior to forwarding the network traffic, which reduces an amount of computing resources (e.g., processing resources, memory resources, communication resources, and/or power resources, among other examples) that need to be used to forward the network traffic (e.g., as would otherwise be needed when using traffic engineering processes). This also reduces or eliminates a latency, or a delay, associated with routing the network traffic that would otherwise result from using traffic engineering processes.

FIGS. 1A-1D are diagrams of an example 100 associated with forwarding network traffic associated with a security classification via a routing path associated with the security classification. As shown in FIGS. 1A-1D, example 100 includes an endpoint device and a plurality of network devices (shown as network devices 1-4) associated with a network. Further details of the endpoint device, the plurality of network devices, and the network are provided elsewhere herein.

In some implementations, a network device, of the plurality of network devices, may be connected to another network device, of the plurality of network devices, via a link, such as an Ethernet link. For example, as shown in FIGS. 1A-1D, the network device 1 may be connected to the network device 2 via a link (1,2), to the network device 3 via a link (1,3), and to the network device 4 via a link (1,4); the network device 2 may be connected to the network device 1 via the link (1,2) and to the network device 4 via a link (2,4); the network device 3 may be connected to the network device 1 via the link (1,3) and to the network device 4 via the link (3,4); and the network device 4 may be connected to the network device 1 via the link (1,4), to the network device 2 via the link (2,4), and to the network device 3 via the link (3,4). In some implementations, a network device, of the plurality of network devices, may not be connected to another network device, of the plurality of network devices, via a link. For example, as further shown in FIGS. 1A-1D, the network device 2 may not be connected to the network device 3 via a link. In this way, the plurality of network devices may be connected to each other via a set of links (e.g., one or more links), such as in a network topology of links.

In some implementations, each link, of the set of links, may be associated with a security classification of a plurality of security classifications. For example, as shown in FIGS. 1A-1D, the link (1,4) (shown with a solid line) may be associated with a first security classification, the link (1,2) and the link (2,4) (shown with dashed lines) may be associated with a second security classification, and the link (1,3) and the link (3,4) (shown with dashed-and-dotted lines) may be associated with a third security classification. A security classification may indicate a type of network traffic that can be transmitted via a link associated with the security classification. For example, the first security classification may be a public security classification, which may indicate that public (e.g., routine, not confidential or classified) network traffic may be transmitted via a link associated with the first security classification (e.g., link (1,4)); the second security classification may be a private security classification, which may indicate that private (e.g., confidential, but not classified) network traffic may be transmitted via a link associated with the second security classification (e.g., link (1,2) and link (2,4)); and the third security classification may be a restricted security classification, which may indicate that restricted (e.g., classified) network traffic may be transmitted via a link associated with the third security classification (e.g., link (1,3) and link (3,4)).

In some implementations, each security classification, of the plurality of security classifications, may have a security level (e.g., where a value of the security level indicates a stringency of the security classification, with a lower value indicating less stringency and a higher value indicating greater stringency). For example, the first security classification may have a security level of 1, the second security classification may have a security level of 2, and the third security classification may have a security level of 3. Accordingly, each link, of the set of links, may be associated with a security classification and the security level of the security classification. For example, as shown in FIGS.

1A-1D, the link (1,4) (shown with a solid line) may be associated with the first security classification and the security level of 1, the link (1,2) and the link (2,4) (shown with dashed lines) may be associated with the second security classification and the security level of 2, and the link (1,3) and the link (3,4) (shown with dashed-and-dotted lines) may be associated with the third security classification and the security level of 3.

In some implementations, as further described herein, network traffic that is associated with a particular security classification, of the plurality of security classifications, may be transmitted via a set of links that are associated with one or more security classifications that have respective security levels that are greater than or equal to a security level of the particular security classification. For example, network traffic associated with the first security classification and the security level of 1 may be transmitted via the link (1,4) (e.g., that has a security level of 1), at least one of the link (1,2) or the link (2,4) (e.g., that have a security level of 2), and/or at least one of the link (1,3) or the link (3,4) (e.g., that have a security level of 3); network traffic associated with the second security classification and the security level of 2 may be transmitted via at least one of the link (1,2) or the link (2,4) (e.g., that have a security level of 2), and/or at least one of the link (1,3) or the link (3,4) (e.g., that have a security level of 3); and network traffic associated with the second security classification and the security level of 3 may be transmitted via the link (1,3) and/or the link (3,4) (e.g., that have a security level of 3).

In some implementations, each link, of the set of links, may be a particular type of link of a plurality of link types (e.g., according to the link's association with a security classification). For example, as shown in FIGS. 1A-1D, the link (1,4) (shown with a solid line), which is associated with the first security classification, may be a link that does not utilize authentication and does not utilize encryption (e.g., a link that does not utilize MACsec); the link (1,2) and the link (2,4) (shown with dashed lines), which are associated with the second security classification, may be links that utilize authentication and not encryption (e.g., links that utilize MACsec for authentication); and the link (1,3) and the link (3,4) (shown with dashed-and-dotted lines), which are associated with the third security classification, may be links that utilize authentication and encryption (e.g., links that utilize MACsec for authentication and encryption). In this way, in some implementations, a security classification may indicate a type of a link that is associated with the security classification. For example, the first security classification, when associated with a link (e.g., link (1,4)), may indicate that the link does not utilize authentication and does not utilize encryption; the second security classification, when associated with a link (e.g., link (1,2) or link (2,4)), may indicate that the link utilizes authentication and not encryption; and the third security classification, when associated with a link (e.g., link (1,3) or link (3,4)), may indicate that the link utilizes authentication and encryption.

In some implementations, each link, of the set of links may be associated with at least one cost metric. For example, a link may be associated with an interior gateway protocol (IGP) cost metric, a traffic engineering (IL) cost metric, and/or one or more other cost metrics. In some implementations, determining a routing path associated with a particular security classification (e.g., as described elsewhere herein), of the plurality of security classifications, from a network device, of the plurality of network devices, to another network device, of the plurality of network devices, may be based on a particular cost metric, of the at least one cost metric, of each of the set of links. For example, determining a first routing path associated with the first security classification may be based on respective first cost metrics (e.g., IGP cost metrics) associated with the set of links, determining a second routing path associated with the second security classification may be based on respective second cost metrics (e.g., TE cost metrics) associated with the set of links, determining a third routing path associated with the third security classification may be based on respective third cost metrics (e.g., other cost metrics) associated with the set of links, and so on.

In some implementations, a network device, of the plurality of network devices, may send one or more advertisement messages to other network devices of the plurality of network devices. For example, as shown in FIG. 1A, and by reference number 105, the network device 4 may send one or more advertisement messages to each of the network device 1, the network device 2, and the network device 3 (e.g., each of the network device 1, the network device 2, and the network device 3 may receive individual copies of the one or more advertisement messages). The network device may send an advertisement message to the other network devices for each link that is connected to the network device. For example, as shown in FIG. 1A, the network device 4 may send, to each of the network device 1, the network device 2, and the network device 3, a first advertisement message associated with the link (1,4), a second advertisement message associated with the link (2,4), and a third advertisement message associated with the link (3,4).

Each advertisement message, of the one or more advertisement messages, may include information identifying the network device, information identifying a link of the network device (e.g., that is associated with the advertisement message), information indicating at least one cost metric of the link (e.g., an IGP cost metric, a TE cost metric, and/or one or more other cost metrics), information indicating that the link is associated with a security classification of the plurality of security classifications, and/or other information. For example, the first advertisement message sent by the network device 4 may include information identifying the network device 4, information identifying the link (1,4), information indicating at least one cost metric of the link (1,4), and information indicating that the link (1,4) is associated with the first security classification; the second advertisement message sent by the network device 4 may include information identifying the network device 4, information identifying the link (2,4), information indicating at least one cost metric of the link (2,4), and information indicating that the link (2,4) is associated with the second security classification; and the third advertisement message sent by the network device 4 may include information identifying the network device 4, information identifying the link (3,4), information indicating at least one cost metric of the link (3,4), and information indicating that the link (3,4) is associated with the third security classification.

Figure 1B:
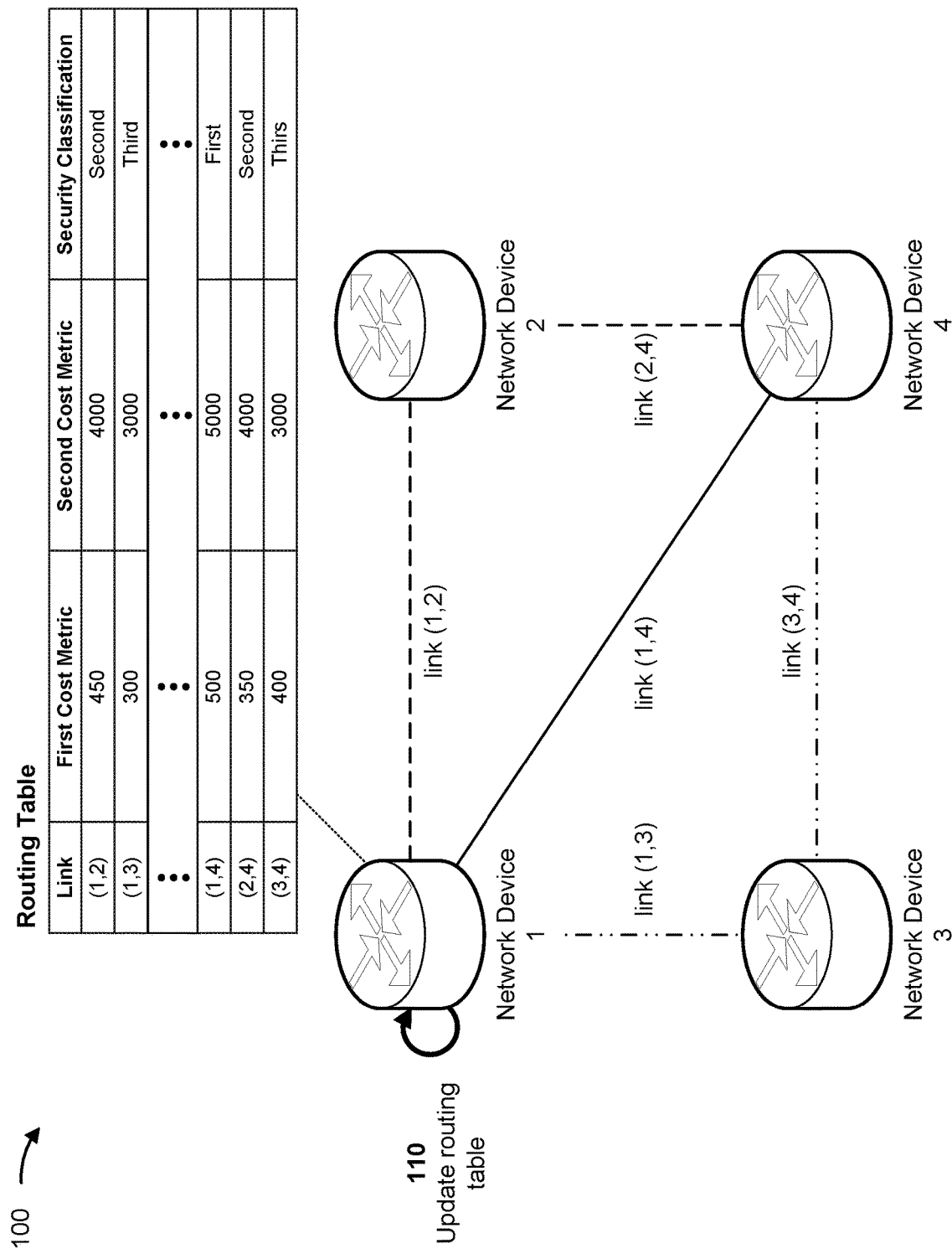

In some implementations, a network device, of the plurality of network devices, may update a routing table (e.g., that is stored and/or maintained by the network device) based on one or more advertisement messages that the network device received from another network device of the plurality of network devices. For example, as shown in FIG. 1B, and by reference number 110, the network device 1 may update a routing table based on one or more advertisement messages that the network device 1 received from the network device 4 (e.g., as described herein in relation to FIG. 1A). The network device may update the routing table by including at least some of the information included in the one or more advertisement messages in the routing table. For example, as show in FIG. 1B, the network device 1 may update a routing table to include, or to modify, entries associated with link (1,4), link (2,4), and link (3,4), wherein the entries respectively include at least some information from the first advertisement message, the second advertisement message, and the third advertisement message (e.g., that were sent from the network device 4 to the network device 1). The routing table may include, for example, an entry associated with each link of the plurality of network devices, and each entry may include information indicating a link, information indicating at least one cost metric of the link, information indicating a security classification, of the plurality of security classifications, that is associated with the link, and/or other information.

Figure 1C:
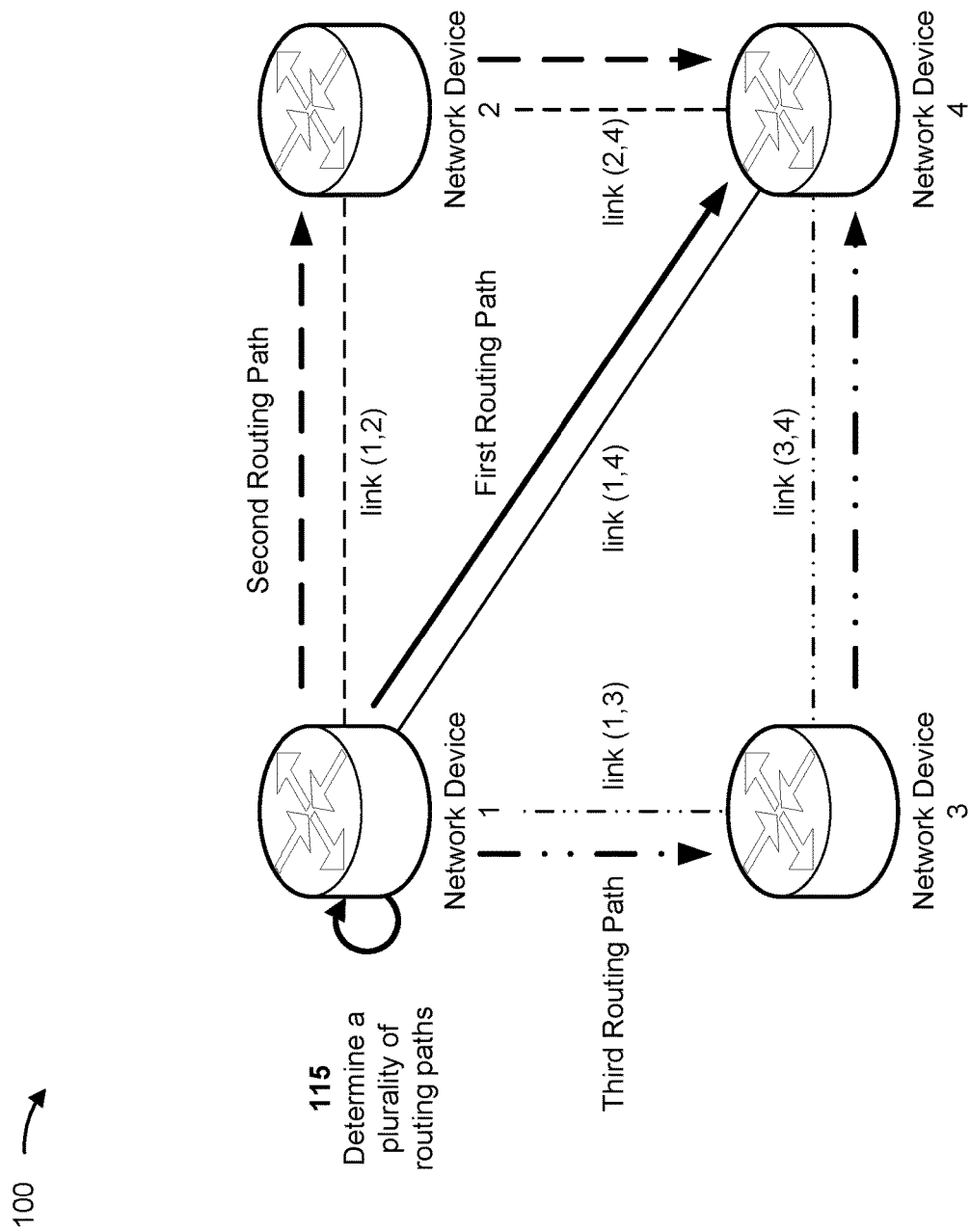

In some implementations, a network device, of the plurality of network devices, may determine a plurality of routing paths from the network device to another network device. The plurality of routing paths may be respectively associated with the plurality of security classifications. For example, as shown in FIG. 1C, and by reference number 115, the network device 1 may determine a plurality of routing paths (e.g., a first routing path, a second routing path, and a third routing path) from the network device 1 to the network device 4. The first routing path (shown as a solid arrow) may be associated with the first security classification, the second routing path (shown as dashed arrows) may be associated with the second security classification, and the third routing path (shown as dashed-and-dotted arrows) may be associated with the third security classification.

The network device may determine the plurality of routing paths based on the routing table (e.g., that is stored and/or maintained by the network device). In some implementations, to determine a particular routing path associated with a particular security classification, the network device may identify a set of links (e.g., by searching and/or reading the routing table) that are associated with one or more security classifications that have respective security levels that are greater than or equal to a security level of the particular security classification. Accordingly, the network device may determine (e.g., based on respective cost metrics of the set of links and using a path computation technique, such as a shortest path first (SPF) technique) the particular routing path.

For example, to determine the first routing path (e.g., that is associated with the first security classification, which has a security level of 1), the network device 1 may identify a first set of links (e.g., by searching and/or reading the routing table) that are associated with at least one of the plurality of security classifications, such as at least one of the first security classification (e.g., that has a security level of 1), the second security classification (e.g., that has a security level of 2), or the third security classification (e.g., that has a security level of 3). The network device 1 may determine (e.g., based on respective cost metrics of the first set of links and using a path computation technique, such as an SPF technique) the first routing path. In this way, the first routing path may include at least one of a link that does not utilize authentication and does not utilize encryption (e.g., a link that does not utilize MACsec), a link that utilizes authentication and not encryption (e.g., a link that utilizes MACsec for authentication), or a link that utilizes authentication and encryption (e.g., a link that utilizes MACsec for authentication and encryption).

As another example, to determine the second routing path (e.g., that is associated with the second security classification, which has a security level of 2), the network device 1 may identify a second set of links (e.g., by searching and/or reading the routing table) that are associated with at least one of a first portion of the plurality of security classifications (and not with a second portion of the plurality of security classifications), such as at least one of the second security classification (e.g., that has a security level of 2) or the third security classification (e.g., that has a security level of 3), and not of the first security classification (e.g., that has a security level of 1). The network device 1 may determine (e.g., based on respective cost metrics of the second set of links and using a path computation technique, such as an SPF technique) the second routing path. In this way, the second routing path may include at least one of a link that utilizes authentication and not encryption (e.g., a link that utilizes MACsec for authentication) or a link that utilizes authentication and encryption (e.g., a link that utilizes MACsec for authentication and encryption), and the second routing path may not include a link that does not utilize authentication and does not utilize encryption (e.g., a link that does not utilize MACsec).

In an additional example, to determine the third routing path (e.g., that is associated with the third security classification, which has a security level of 3), the network device 1 may identify a third set of links (e.g., by searching and/or reading the routing table) that are associated with the third security classification (e.g., that has a security level of 3), and not of the first security classification (e.g., that has a security level of 1) and the second security classification (e.g., that has a security level of 2). The network device 1 may determine (e.g., based on respective cost metrics of the third set of links and using a path computation technique, such as an SPF technique) the third routing path. In this way, the third routing path may include a link that utilizes authentication and encryption (e.g., a link that utilizes MACsec for authentication and encryption), and the third routing path may not include a link that does not utilize authentication and does not utilize encryption (e.g., a link that does not utilize MACsec) and a link that utilizes authentication and not encryption (e.g., a link that utilizes MACsec for authentication).

Figure 1D:
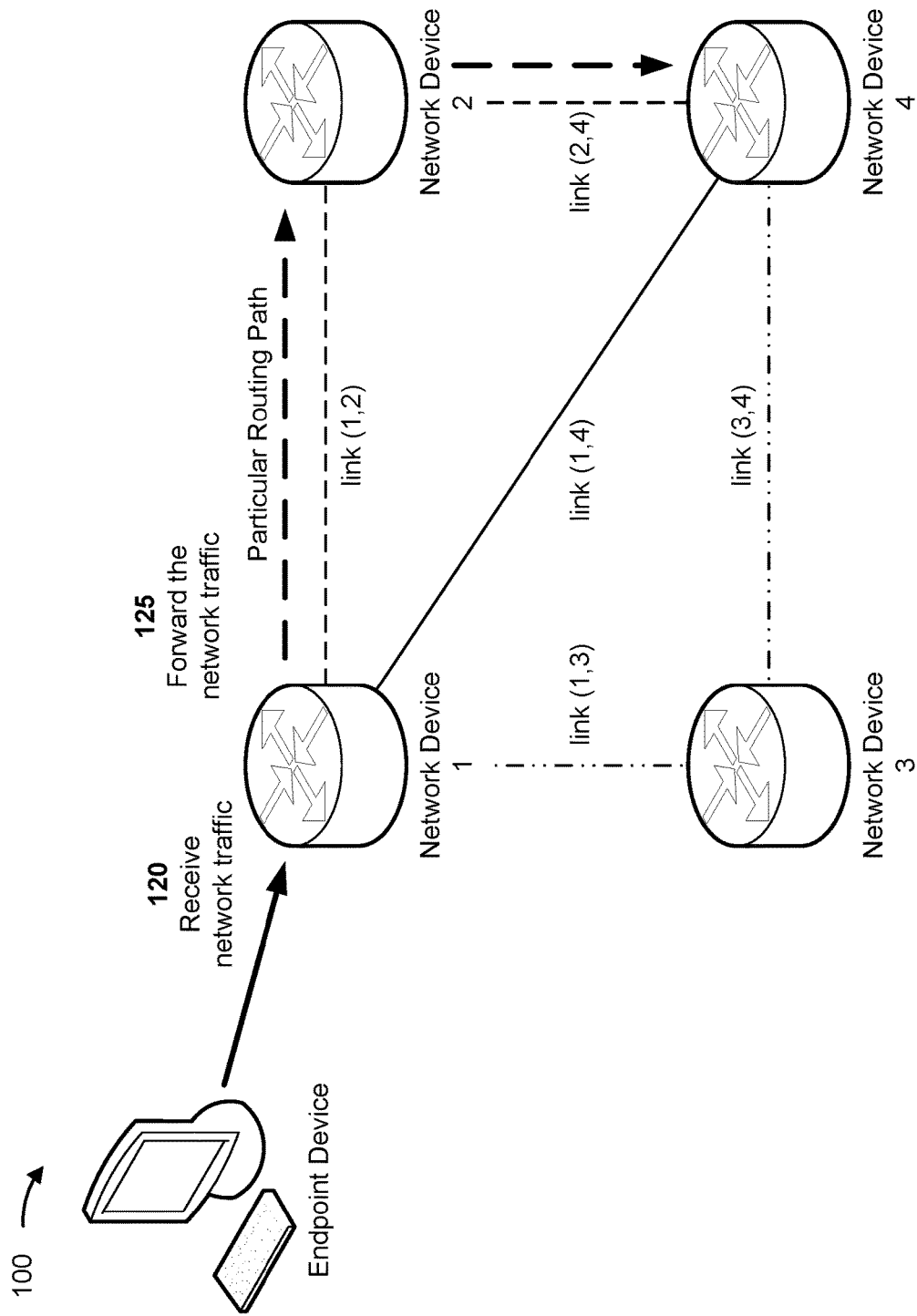

In some implementations, a network device, of the plurality of network devices, may receive network traffic that is destined for another network device, of the plurality of network devices, and that is associated with a particular security classification of the plurality of security classifications. For example, as shown in FIG. 1D, and by reference number 120, the network device 1 may receive network traffic (e.g., from the endpoint device). The network traffic may be destined for the network device 4 and may be associated with a particular security classification of the first security classification, the second security classification, or the third security classification.

In some implementations, the network device may forward the network traffic based on a particular routing path, of the plurality of routing paths, that is associated with the other network device and the particular security classification. For example, as further shown in FIG. 1D, and by reference number 125, the network device 1 may forward the network traffic based on a particular routing path (shown as the second routing path), of the first routing path, the second routing path, or the third routing path, that is associated with the network device 4 and the particular security classification of the network traffic.

In some implementations, to forward the network traffic, the network device may process the network traffic to determine that the network traffic is destined for the other network device and that the network traffic is associated with the particular security classification. Accordingly, the network device may select, based on information identifying the other network device and the particular security classification, the particular routing path that is associated with the other network device and the particular security classification. The network device may determine a next hop for the network traffic (e.g., as indicated by the particular routing path) and may forward the network traffic to the next hop. In this way, the network device may cause the network traffic to be forwarded according to the particular routing path.

Moreover, in this way, the network device may cause the network traffic to be transmitted, from the network device to the other network device, via one or more links that are associated with one or more security classifications that have respective security levels that are greater than or equal to a security level of the particular security classification. For example, in relation to FIG. 1D, the network device 1 may cause the network traffic to be transmitted, from the network device 1 to the network device 4, via one or more links that are associated with one or more security classifications (e.g., the second security classification, which has a security level of 2, and/or the third security classification, which has a security level of 3) that have respective security levels that are greater than or equal to a security level of the particular security classification (e.g., the second security classification, which has a security level of 2).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
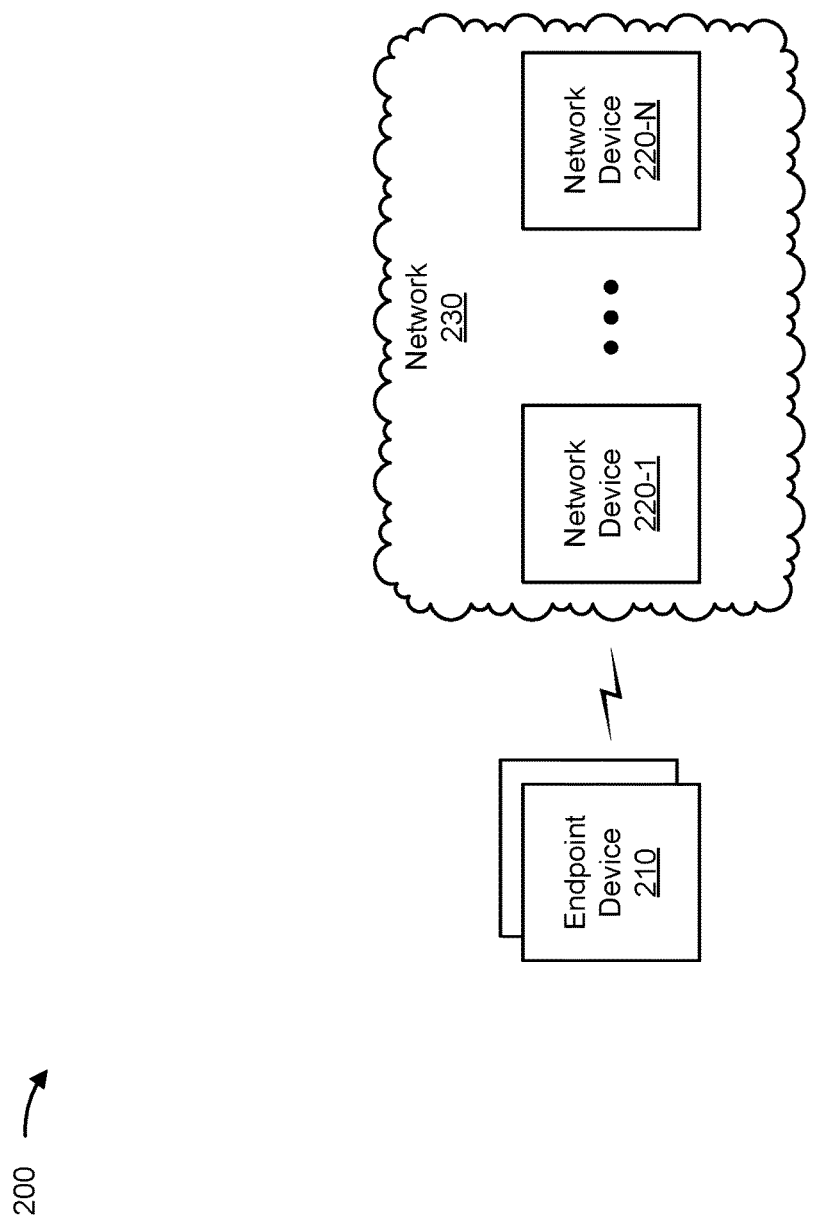
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more endpoint devices 210, a group of network devices 220 (shown as network device 220-1 through network device 220-N, where N≥2), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may provide network traffic to other endpoint devices 210 and/or may receive network traffic, via network 230 (e.g., by routing the network traffic using network devices 220 as intermediaries).

Network device 220 includes one or more devices capable of receiving, processing, storing, routing, and/or providing network traffic in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route network traffic through network 230. In some implementations, network device 220 may receive (e.g., from endpoint device 210 or another network device 220) traffic network that is associated with a particular security classification of a plurality of security classifications; determine a plurality of routing paths from the network device 220 to another network device 220 (e.g., wherein the plurality of routing paths are respectively associated with the plurality of security classifications); and/or may forward the network device based on a particular routing path, of the plurality of routing paths, that is associated with the other network device and the particular security classification.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
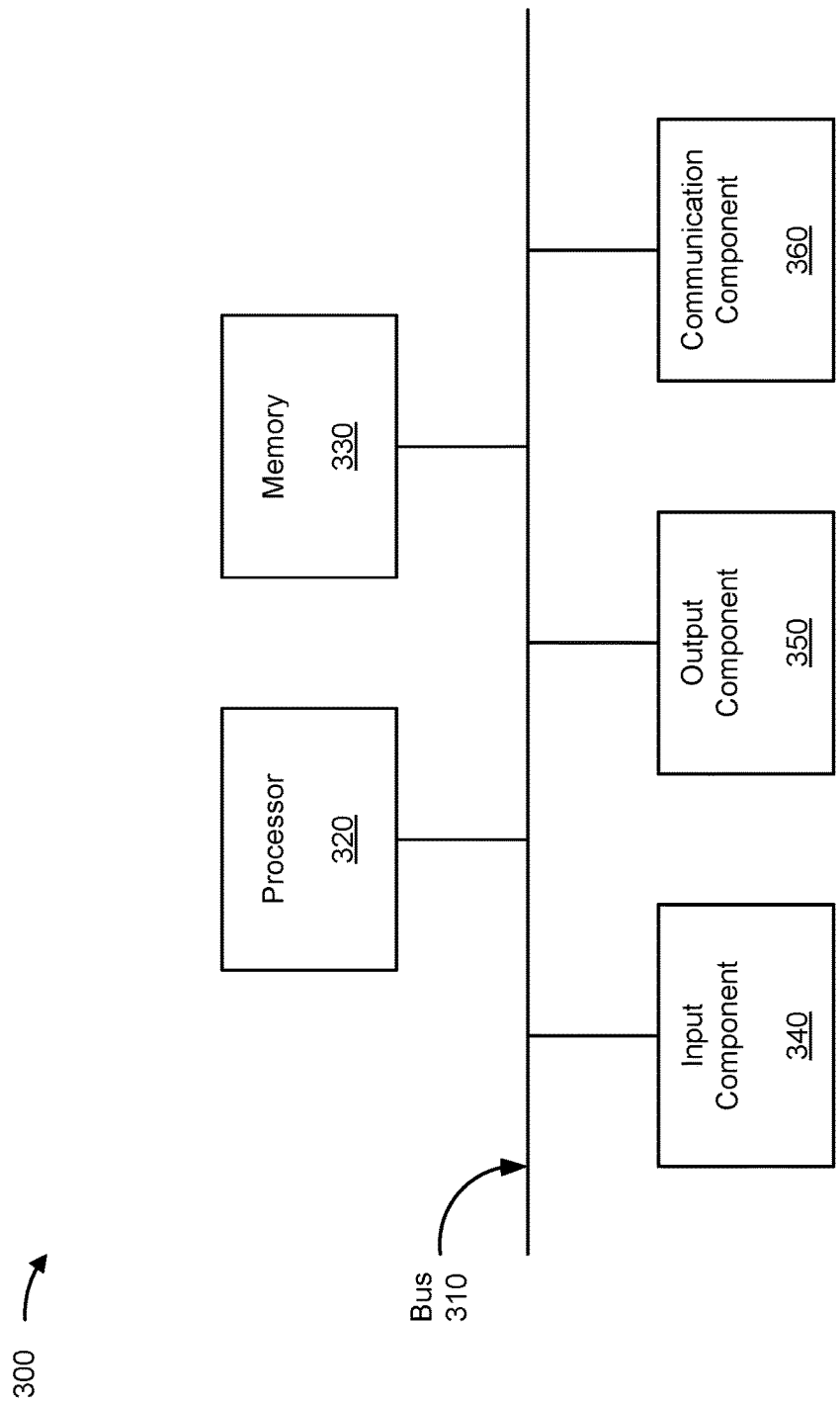
FIGS. 3 and 4 are diagrams of example components of one or more devices of FIG. 2.

FIG. 3 is a diagram of example components of a device 300, which may correspond to endpoint device 210 and/or network device 220. In some implementations, endpoint device 210 and/or network device 220 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
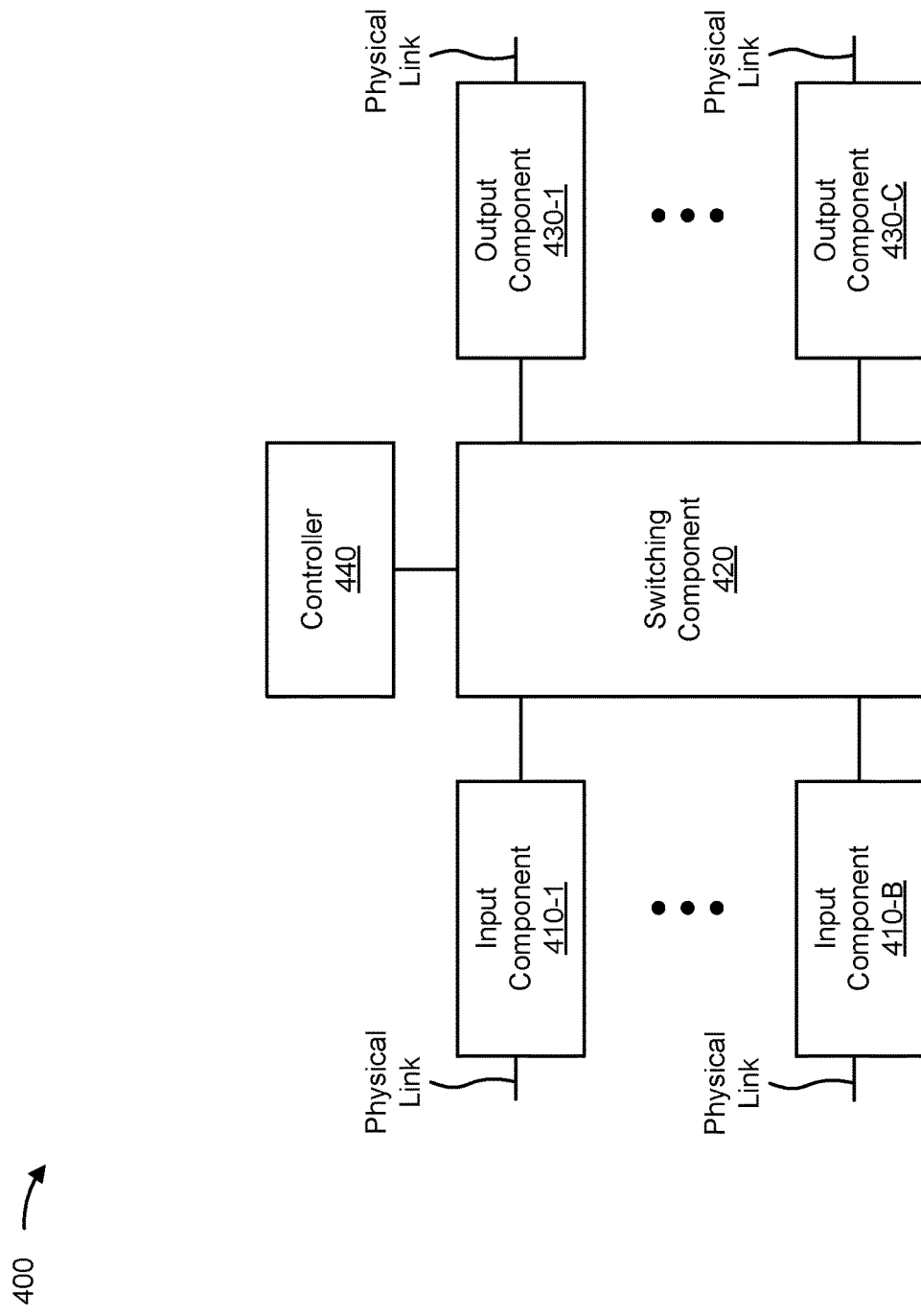

FIG. 4 is a diagram of example components of a device 400. Device 400 may correspond to endpoint device 210 and/or network device 220. In some implementations, endpoint device 210 and/or network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
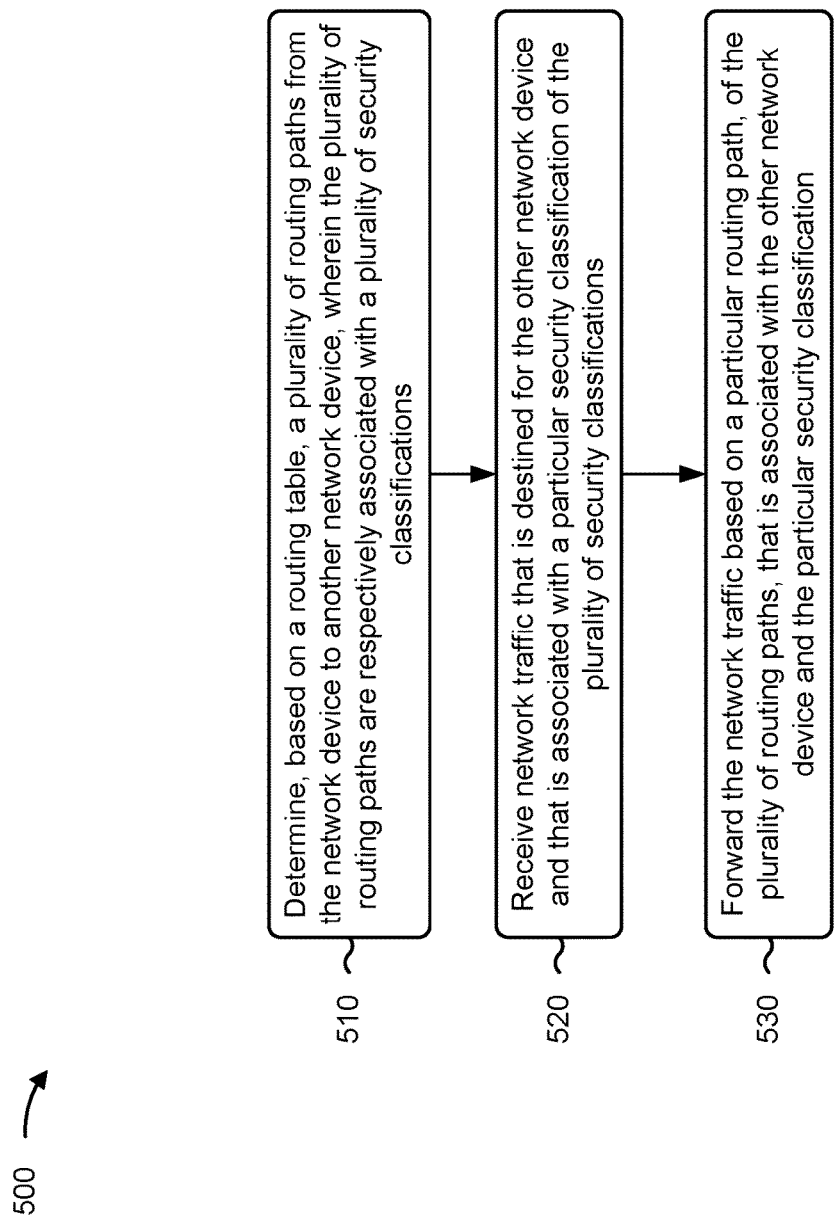
FIGS. 5-6 are flowcharts of example processes relating to forwarding network traffic associated with a security classification via a routing path associated with the security classification.

FIG. 5 is a flowchart of an example process 500 associated with forwarding network traffic associated with a security classification via a routing path associated with the security classification. In some implementations, one or more process blocks of FIG. 5 are performed by a network device (e.g., network device 220). In some implementations, one or more process blocks of FIG. 5 are performed by another device or a group of devices separate from or including the network device, such as an endpoint device (e.g., endpoint device 210). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include determining, based on a routing table, a plurality of routing paths from the network device to another network device, wherein the plurality of routing paths are respectively associated with a plurality of security classifications (block 510). For example, the network device may determine, based on a routing table, a plurality of routing paths from the network device to another network device, wherein the plurality of routing paths are respectively associated with a plurality of security classifications, as described above. In some implementations, the plurality of routing paths are respectively associated with a plurality of security classifications.

As further shown in FIG. 5, process 500 may include receiving network traffic that is destined for the other network device and that is associated with a particular security classification of the plurality of security classifications (block 520). For example, the network device may receive network traffic that is destined for the other network device and that is associated with a particular security classification of the plurality of security classifications, as described above.

As further shown in FIG. 5, process 500 may include forwarding the network traffic based on a particular routing path, of the plurality of routing paths, that is associated with the other network device and the particular security classification (block 530). For example, the network device may forward the network traffic based on a particular routing path, of the plurality of routing paths, that is associated with the other network device and the particular security classification, as described above.

Process 500 may include additional implementations, such as any single implementation or any combination of implementations described below and/or in connection with one or more other processes described elsewhere herein.

In a first implementation, process 500 includes receiving, from the other network device and prior to determining the plurality of routing paths, one or more advertisement messages, wherein each of the one or more advertisement messages includes at least one of information identifying the other network device, information identifying a link of the other network device, information indicating at least one cost metric of the link, or information indicating that the link is associated with a security classification of the plurality of security classifications, and updating, based on the one or more advertisement messages, the routing table.

In a second implementation, alone or in combination with the first implementation, wherein a first routing path, of the plurality or routing paths, includes at least one of a link that does not utilize authentication and does not utilize encryption, a link that utilizes authentication and not encryption, or a link that utilizes authentication and encryption, and a second routing path, of the plurality of routing paths, includes at least one of a link that utilizes authentication and not encryption or a link that utilizes authentication and encryption, and does not include a link that does not utilize authentication and does not utilize encryption.

In a third implementation, alone or in combination with one or more of the first and second implementations, wherein a first routing path, of the plurality of routing paths, includes a set of links that are associated with at least one of the plurality of security classifications, and a second routing path, of the plurality of routing paths, includes a set of links that are associated with at least one of a first set of the plurality of security classifications, and not with a second set of the plurality of security classifications.

In a fourth implementation, alone or in combination with one or more of the first through third implementations, wherein forwarding the network traffic based on the particular routing path is to cause the network traffic to be transmitted, from the network device to the other network device, via one or more links that are associated with security classifications that have respective security levels that are greater than or equal to a security level of the particular security classification.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
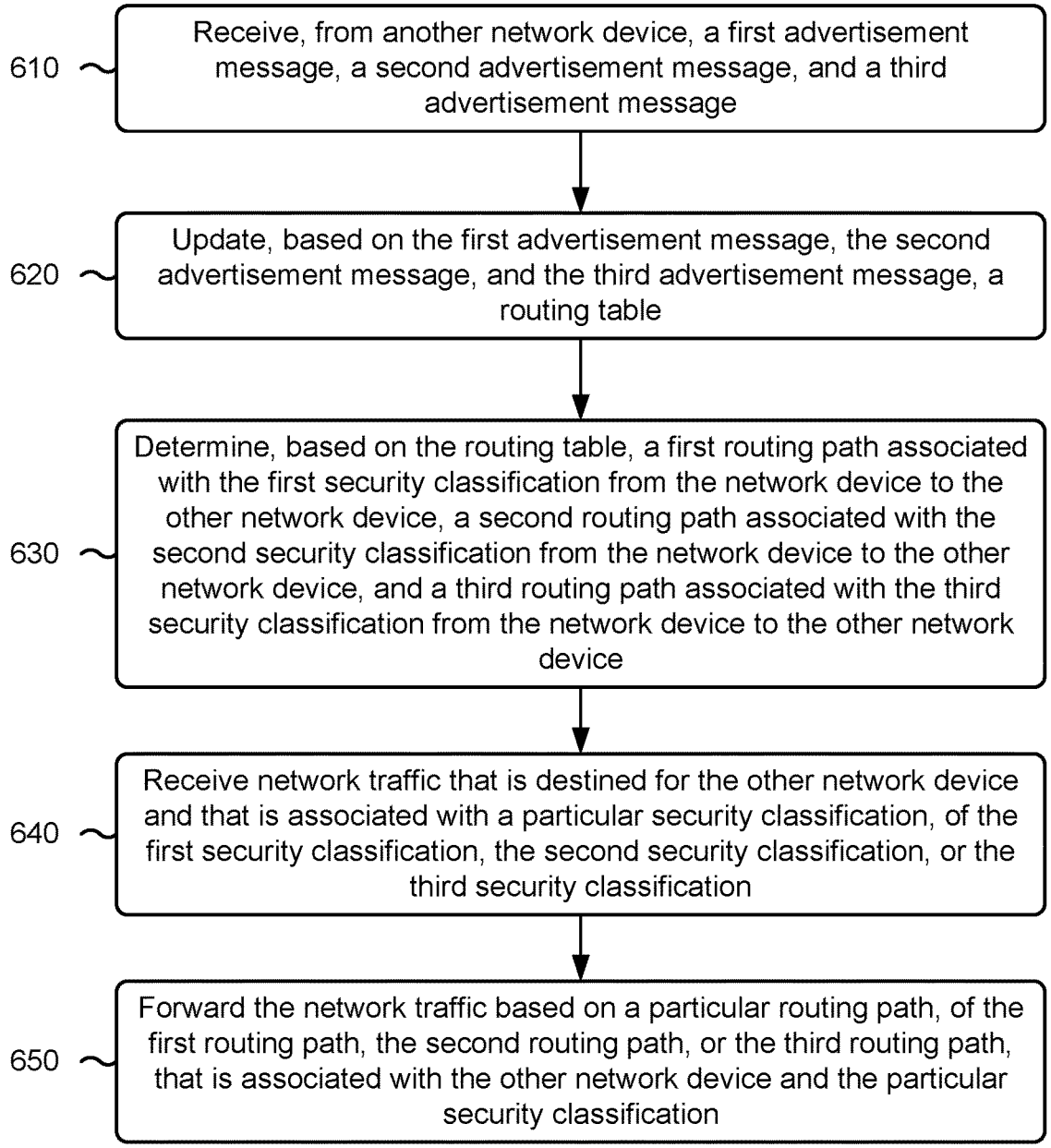

FIG. 6 is a flowchart of an example process 600 associated with forwarding network traffic associated with a security classification via a routing path associated with the security classification. In some implementations, one or more process blocks of FIG. 6 are performed by a network device (e.g., network device 220). In some implementations, one or more process blocks of FIG. 6 are performed by another device or a group of devices separate from or including the network device, such as an endpoint device (e.g., endpoint device 210). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 6, process 600 may include receiving, from another network device, a first advertisement message, a second advertisement message, and a third advertisement message (block 610). For example, the network device may receive, from another network device, a first advertisement message, a second advertisement message, and a third advertisement message, as described above. In some implementations, the first advertisement message includes information indicating that a first link of the other network device is associated with a first security classification, the second advertisement message includes information indicating that a second link of the other network device is associated with a second security classification, and the third advertisement message includes information indicating that a third link of the other network device is associated with a third security classification As further shown in FIG. 6, process 600 may include updating, based on the first advertisement message, the second advertisement message, and the third advertisement message, a routing table (block 620). For example, the network device may update, based on the first advertisement message, the second advertisement message, and the third advertisement message, a routing table, as described above.

As further shown in FIG. 6, process 600 may include determining, based on the routing table, a first routing path associated with the first security classification from the network device to the other network device, a second routing path associated with the second security classification from the network device to the other network device, and a third routing path associated with the third security classification from the network device to the other network device (block 630). For example, the network device may determine, based on the routing table, a first routing path associated with the first security classification from the network device to the other network device, a second routing path associated with the second security classification from the network device to the other network device, and a third routing path associated with the third security classification from the network device to the other network device, as described above.

As further shown in FIG. 6, process 600 may include receiving network traffic that is destined for the other network device and that is associated with a particular security classification, of the first security classification, the second security classification, or the third security classification (block 640). For example, the network device may receive network traffic that is destined for the other network device and that is associated with a particular security classification, of the first security classification, the second security classification, or the third security classification, as described above.

As further shown in FIG. 6, process 600 may include forwarding the network traffic based on a particular routing path, of the first routing path, the second routing path, or the third routing path, that is associated with the other network device and the particular security classification (block 650). For example, the network device may forward the network traffic based on a particular routing path, of the first routing path, the second routing path, or the third routing path, that is associated with the other network device and the particular security classification, as described above.

Process 600 may include additional implementations, such as any single implementation or any combination of implementations described below and/or in connection with one or more other processes described elsewhere herein.

In a first implementation, the first advertisement message further includes at least one of information identifying the other network device, information identifying the first link of the other network device, or information indicating at least one cost metric of the first link, the second advertisement message further includes at least one of information identifying the other network device, information identifying the second link of the other network device, or information indicating at least one cost metric of the second link, and the third advertisement message further includes at least one information identifying the other network device, information identifying the third link of the other network device, or information indicating at least one cost metric of the third link.

In a second implementation, alone or in combination with the first implementation, the first security classification is associated with a public security classification, the second security classification is associated with a private security classification, and the third security classification is associated with a restricted security classification.

In a third implementation, alone or in combination with one or more of the first and second implementations, the first link of the other network device is a link that does not utilize MACsec, the second link of the other network device is a link that utilizes MACsec for authentication, and the third link of the other network device is a link that utilizes MACsec for authentication and encryption.

In a fourth implementation, alone or in combination with one or more of the first through third implementations, the first routing path includes at least one of a link that does not utilize MACsec, a link that utilizes MACsec for authentication, or a link that utilizes MACsec for authentication and encryption, the second routing path includes at least one of a link that utilizes MACsec for authentication or a link that utilizes MACsec for authentication and encryption, and does not include a link that does not utilize MACsec, and the third routing path includes a link that utilizes MACsec for authentication and encryption, and does not include a link that does not utilize MACsec and a link that utilizes MACsec for authentication.

In a fifth implementation, alone or in combination with one or more of the first through fourth implementations, determining the first routing path, the second routing path, and the third routing path includes identifying, based on the routing table, a first set of links associated with at least one of the first security classification, the second security classification, or the third security classification; determining, based on the first set of links and using a path computation technique, the first routing path; identifying, based on the routing table, a second set of links associated with at least one of the second security classification or the third security classification; determining, based on the second set of links and using the path computation technique, the second routing path, identifying, based on the routing table, a third set of links associated with the third security classification; and determining, based on the third set of links and using the path computation technique, the third routing path.

In a sixth implementation, alone or in combination with one or more of the first through fifth implementations, forwarding the network traffic includes processing the network traffic to determine that the network traffic is destined for the other network device and that the network traffic is associated with the particular security classification, selecting, based on information identifying the other network device and the particular security classification, the particular routing path that is associated with the other network device and the particular security classification, determining, based on the particular routing path, a next hop for the network traffic, and forwarding the network traffic to the next hop.

In a seventh implementation, alone or in combination with one or more of the first through sixth implementations, forwarding the network traffic based on the particular routing path is to cause the network traffic to be transmitted, from the network device to the other network device, via one or more links that are associated with security classifications that have respective security levels that are greater than or equal to a security level of the particular security classification.

In an eighth implementation, alone or in combination with one or more of the first through seventh implementations, the first routing path includes at least one of a link that does not utilize authentication and does not utilize encryption, a link that utilizes authentication and not encryption, or a link that utilizes authentication and encryption; the second routing path includes at least one of a link that utilizes authentication and not encryption or a link that utilizes authentication and encryption, and does not include a link that does not utilize authentication and does not utilize encryption; and the third routing path includes a link that utilizes authentication and encryption, and does not include a link that does not utilize authentication and does not utilize encryption and a link that utilizes authentication and not encryption.

In a ninth implementation, alone or in combination with one or more of the first through eighth implementations, the first routing path includes a set of links that are associated with at least one of the first security classification, the second security classification, or the third security classification; the second routing path includes a set of links that are associated with at least one of the second security classification or the third security classification, and not the first security classification; and the third routing path includes a set of links that are associated with the third security classification, and not the first security classification and the second security classification.

In a tenth implementation, alone or in combination with one or more of the first through ninth implementations, forwarding the network traffic includes processing the network traffic to determine that the network traffic is destined for the other network device and that the network traffic is associated with the particular security classification, selecting, based on information identifying the other network device and the particular security classification, the particular routing path that is associated with the other network device and the particular security classification, and forwarding the network traffic to a next hop indicated by the particular routing path.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, network traffic may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device, comprising:
one or more memories; and
one or more processors to:
receive, from another network device, a first message, a second message, and a third message, wherein:
the first message includes information indicating that a first link of the other network device is associated with a first security classification based on a first cost metric,
the second message includes information indicating that a second link of the other network device is associated with a second security classification based on a second cost metric, and
the third message includes information indicating that a third link of the other network device is associated with a third security classification based on a third cost metric,
wherein the first cost metric, the second cost metric, and the third cost metric are different,
wherein the first cost metric, the second cost metric, or the third cost metric is one or more of:
an interior gateway protocol (IGP) cost metric, or
a traffic engineering (TE) cost metric;
update, based on the first message, the second message, and the third message, a routing table;
determine, based on the routing table, a first routing path associated with the first security classification from the network device to the other network device, a second routing path associated with the second security classification from the network device to the other network device, and a third routing path associated with the third security classification from the network device to the other network device;
receive network traffic that is destined for the other network device and that is associated with a particular security classification, of the first security classification, the second security classification, or the third security classification; and
forward the network traffic based on a particular routing path, of the first routing path, the second routing path, or the third routing path, that is associated with the other network device and the particular security classification.

2. The network device of claim 1, wherein:
the first message further includes at least one of information identifying the other network device or information identifying the first link of the other network device;
the second message further includes at least one of information identifying the other network device or information identifying the second link of the other network; and
the third message further includes at least one information identifying the other network device or information identifying the third link of the other network device.

3. The network device of claim 1, wherein:
the first security classification is associated with a public security classification;
the second security classification is associated with a private security classification; and
the third security classification is associated with a restricted security classification.

4. The network device of claim 1, wherein:
the first link of the other network device is a link that does not utilize media access control security (MACsec);
the second link of the other network device is a link that utilizes MACsec for authentication; and
the third link of the other network device is a link that utilizes MACsec for authentication and encryption.

5. The network device of claim 1, wherein: the first routing path includes at least one of a link that does not utilize media access control security (MACsec), a link that utilizes MACsec for authentication, or a link that utilizes MACsec for authentication and encryption;
the second routing path includes at least one of a link that utilizes MACsec for authentication or a link that utilizes MACsec for authentication and encryption, and does not include a link that does not utilize MACsec; and
the third routing path includes a link that utilizes MACsec for authentication and encryption, and does not include a link that does not utilize MACsec and a link that utilizes MACsec for authentication.

6. The network device of claim 1, wherein the one or more processors, to determine the first routing path, the second routing path, and the third routing path, are to:
identify, based on the routing table, a first set of links associated with at least one of the first security classification, the second security classification, or the third security classification;
determine, based on the first set of links and using a path computation technique, the first routing path;
identify, based on the routing table, a second set of links associated with at least one of the second security classification or the third security classification;
determine, based on the second set of links and using the path computation technique, the second routing path;
identify, based on the routing table, a third set of links associated with the third security classification; and
determine, based on the third set of links and using the path computation technique, the third routing path.

7. The network device of claim 1, wherein the one or more processors, to forward the network traffic, are to:
process the network traffic to determine that the network traffic is destined for the other network device and that the network traffic is associated with the particular security classification;
select, based on information identifying the other network device and the particular security classification, the particular routing path that is associated with the other network device and the particular security classification;
determine, based on the particular routing path, a next hop for the network traffic;
and forward the network traffic to the next hop.

8. The network device of claim 1, wherein forwarding the network traffic based on the particular routing path is to cause the network traffic to be transmitted, from the network device to the other network device, via one or more links that are associated with security classifications that have respective security levels that are greater than or equal to a security level of the particular security classification.

9. A non-transitory computer-readable medium storing a set of instructions, the set of instructions comprising:
one or more instructions that, when executed by one or more processors of a network device, cause the network device to:

determine, based on a routing table, a first routing path, based on a first cost metric, associated with a first security classification from the network device to another network device;

determine, based on the routing table, a second routing path, based on a second cost metric, associated with a second security classification from the network device to the other network device;

determine, based on the routing table, a third routing path, based on a third cost metric, associated with a third security classification from the network device to the other network device, wherein the first cost metric, the second cost metric, and the third cost metric are different, and wherein the first cost metric, the second cost metric, or the third cost metric is one or more of:
an interior gateway protocol (IGP) cost metric, or
a traffic engineering (TE) cost metric;

receive network traffic that is destined for the other network device and that is associated with a particular security classification, of the first security classification, the second security classification, or the third security classification; and forward the network traffic based on a particular routing path, of the first routing path, the second routing path, or the third routing path, that is associated with the other network device and the particular security classification.

10. The non-transitory computer-readable medium of claim 9, wherein the one or more instructions, when executed by the one or more processors, further cause the network device to:

receive, from the other network device and prior to determining the first routing path, the second routing path, and the third routing path, one or more messages, wherein each of the one or more messages includes at least one of:
information identifying the other network device;
information identifying a link of the other network device; or
information indicating that the link is associated with a security classification of the first security classification, the second security classification, or the third security classification.

11. The non-transitory computer-readable medium of claim 10, wherein the one or more instructions, when executed by the one or more processors, further cause the network device to:

update, based on the one or more messages, the routing table.

12. The non-transitory computer-readable medium of claim 9, wherein: the first routing path includes at least one of a link that does not utilize authentication and does not utilize encryption, a link that utilizes authentication and not encryption, or a link that utilizes authentication and encryption;

the second routing path includes at least one of a link that utilizes authentication and not encryption or a link that utilizes authentication and encryption, and does not include a link that does not utilize authentication and does not utilize encryption; and the third routing path includes a link that utilizes authentication and encryption, and does not include a link that does not utilize authentication and does not utilize encryption and a link that utilizes authentication and not encryption.

13. The non-transitory computer-readable medium of claim 9, wherein: the first routing path includes a set of links that are associated with at least one of the first security classification, the second security classification, or the third security classification;

the second routing path includes a set of links that are associated with at least one of the second security classification or the third security classification, and not the first security classification; and the third routing path includes a set of links that are associated with the third security classification, and not the first security classification and the second security classification.

14. The non-transitory computer-readable medium of claim 9, wherein the one or more instructions, that cause the network device to forward the network traffic, cause the network device to:

process the network traffic to determine that the network traffic is destined for the other network device and that the network traffic is associated with the particular security classification;

select, based on information identifying the other network device and the particular security classification, the particular routing path that is associated with the other network device and the particular security classification; and forward the network traffic to a next hop indicated by the particular routing path.

15. The non-transitory computer-readable medium of claim 9, wherein forwarding the network traffic based on the particular routing path is to cause the network traffic to be transmitted, from the network device to the other network device, via one or more links that are associated with security classifications that have respective security levels that are greater than or equal to a security level of the particular security classification.

16. A method, comprising:
determining, by a network device and based on a routing table, a plurality of routing paths from the network device to another network device,
wherein the plurality of routing paths are respectively associated with a plurality of security classifications;
wherein the plurality of routing paths are each associated with a different cost metric, and
wherein a cost metric, of a plurality of cost metrics is:
an interior gateway protocol (IGP) cost metric, or
a traffic engineering (TE) cost metric;
receiving, by the network device, network traffic that is destined for the other network device and that is associated with a particular security classification of the plurality of security classifications; and
forwarding, by the network device, the network traffic based on a particular routing path, of the plurality of routing paths, that is associated with the other network device and the particular security classification.

17. The method of claim 16, further comprising:
receiving, from the other network device and prior to determining the plurality of routing paths, one or more messages,
wherein each of the one or more messages includes at least one of:
information identifying the other network device,
information identifying a link of the other network device,
information indicating at least one cost metric of the link, or information indicating that the link is associated with a security classification of the plurality of security classifications; and updating, based on the one or more messages, the routing table.

18. The method of claim 16, wherein: a first routing path, of the plurality or routing paths, includes at least one of a link that does not utilize authentication and does not utilize encryption, a link that utilizes authentication and not encryption, or a link that utilizes authentication and encryption;
and a second routing path, of the plurality of routing paths, includes at least one of a link that utilizes authentication and not encryption or a link that utilizes authentication and encryption, and does not include a link that does not utilize authentication and does not utilize encryption.

19. The method of claim 16, wherein:
a first routing path, of the plurality of routing paths, includes a set of links that are associated with at least one of the plurality of security classifications; and
a second routing path, of the plurality of routing paths, includes a set of links that are associated with at least one of a first set of the plurality of security classifications, and not with a second set of the plurality of security classifications.

20. The method of claim 16, wherein forwarding the network traffic based on the particular routing path is to cause the network traffic to be transmitted, from the network device to the other network device, via one or more links that are associated with security classifications that have respective security levels that are greater than or equal to a security level of the particular security classification.

\* \* \* \* \*